Figure 1:
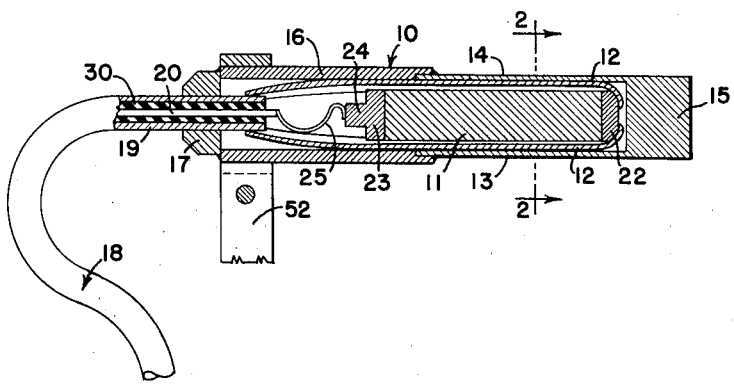

June 12, 1962   R. W. FRITTS ETAL   3,038,956
HERMETICALLY SEALED THERMOELECTRIC GENERATOR AND LEAD ASSEMBLY
Original Filed April 8, 1955

*INVENTORS*
ROBERT W. FRITTS
SEBASTIAN KARRER
BY
*Carpenter Abbott Coulter & Kinney*
ATTORNEYS

United States Patent Office 3,038,956
Patented June 12, 1962

3,038,956
HERMETICALLY SEALED THERMOELECTRIC GENERATOR AND LEAD ASSEMBLY
Robert W. Fritts, Arden Hills, Minn., and Sebastian Karrer, Port Republic, Md., assignors to Minnesota Mining and Manufacturing Company, St. Paul, Minn., a corporation of Delaware
Original application Apr. 8, 1955, Ser. No. 500,192, now Patent No. 2,892,879, dated June 30, 1959. Divided and this application Dec. 8, 1958, Ser. No. 778,838
5 Claims. (Cl. 174—17)

This application is a division of our copending application Serial No. 500,192, filed April 8, 1955, now Patent Number 2,892,879, and relates to improvements in electrical devices utilizing electrically conductive elements of frangible material, and more particularly to electrical devices embodying improved hermetic sealing means for the protection of such elements.

In the development of improved electrical devices, it has been found desirable to utilize components of electrically conductive material which is of a frangible nature. For example, semi-metallic alloys or compositions have been found to be particularly well adapted for use in thermoelectric devices for conversion or transfer of heat and electrical energy. Thermoelectric generators are illustrative of one such use of semi-metallic components. Utilization of semi-metallic alloys as electrical conductors presents problems not ordinarily encountered in the use, for example, of metallic electrical conductor elements, said problems arising from the characteristic physical and chemical differences between metallic elements and semi-metallic elements. For example, electrical conductors utilized as thermocouple elements are of necessity subjected to high temperatures and to large temperature changes, and treatment of semi-metallic electrical conductors utilized as thermocouple elements in the same manner as metallic elements would quickly destroy the semi-metallic elements, since at elevated temperatures semi-metallic elements oxidize rapidly and suffer undesirable changes in their electrical properties. Moreover, the mechanical or physical strength of semi-metallic elements is such that they are able to withstand only small tensile or shearing stresses, although mild compressive loads can be supported indefinitely.

In the use of semi-metallic materials in thermocouples, for example, the problem presented by the low physical strength of the semi-metallic element is further complicated by the fact that for maximum thermal or electrical efficiency said elements are formed with a length greater than the cross-sectional dimension thereof, for example in elongated cylindrical ingots. When an element of the aforementioned character is held at one or both ends, subjecting said element to acceleration or shock acting transversely to the longitudinal axis thereof produces relatively severe tensile stresses within the element tending to produce fracture thereof. To prevent such fracture, the net stresses, particularly tensile stresses, to which a semi-metallic element is subjected must not exceed the physical strength of said element. To accomplish this, the mounting for a semi-metallic element must not only protect said element against stresses which might arise therein as a result of the aforementioned transverse acceleration or shock, but it must also be so constructed that on thermal expansion any mismatch between the semi-metallic element and the surrounding parts tending to stress said element tends to exert a compressive stress on said element rather than to exert a tensile stress thereon.

It is therefore among the objects of the present invention to provide an improved electrical device, for example a thermoelectric generator, embodying shock-resistant mounting means for an electrically conductive element of frangible, for example semi-metallic, material.

Another object is to provide an electrical device of the aforementioned character including a frangible conductor element wherein:

(1) The element is provided with an hermetically sealed enclosure affording disposition of said element in an inert atmosphere preventing, for the lifetime of the device, exposure of said element to oxygen or other deleterious gases.

(2) The element is supported within the enclosure in a manner to allow displacement of at least a part of said element for dissipation of the kinetic energy change for the element during transverse acceleration or shock without permitting impact of the element against the enclosure; and/or the element is placed under compression to reduce the net tensile stresses exerted thereon during transverse acceleration wherefore increased bending displacement of said element is permitted within the physical limits, and more particularly the tensile strength thereof.

(3) The thermal expansion differential between the element and its mounting is such that any residual stresses resulting from a thermal expansion differential between the two are compressive in nature with respect to the element and fall within the compressive strength of said element.

(4) The electrical connections for the element are of a nature to afford continuity of the electrical circuit during displacement due to mechanical shock and/or thermal expansion and contraction.

(5) The electrical connections for the element are of such a character as to be chemically stable with respect to said element.

(6) Efficient heat transfer through the assembly is provided by exposure of the thermal junctions of the element within the enclosure permitting radiative and/or conductive heat transfer to and from said junctions through said enclosure, thereby affording maximum conversion efficiency.

Another object of the invention is to provide a device of the aforementioned character having integral therewith a coaxial type lead, there being hermetic sealing means at the connector end of said lead whereby said lead and the enclosure for said element form a single hermetically sealed envelope.

Other objects and advantages of the invention will become apparent as the description proceeds, reference being had to the drawings accompanying and forming a part of this specification and illustrating the inventive concept.

Figure 2:
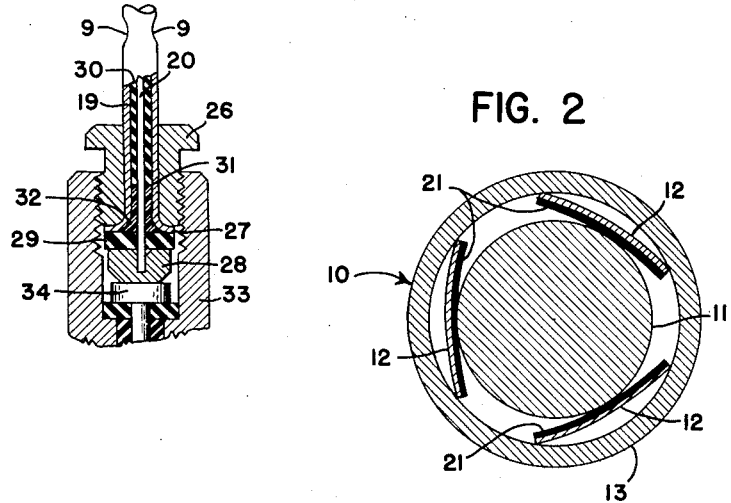

In the drawing:

FIGURE 1 is a fragmentary elevational view, partly in longitudinal section, showing a thermocouple and lead assembly constructed in accordance with the teachings of the present invention; and FIGURE 2 is an enlarged transverse sectional view taken approximately along the line 2—2 of FIGURE 1.

Referring now to FIGURE 1 of the drawings, the electrical device selected for illustration therein comprises a thermoelectric generator 10 including a pair of thermocouple element means 11 and 12 disposed within an hermetically sealed enclosure comprising an elongated generally cup-shaped sheath member 13, preferably of stainless steel, having a tubular sleeve portion 14 and a tip portion 15 which may serve as heat probe means for the assembly. The opposite end of the sheath 13 is coaxially received in a counterbore formed in one end of an extension tube 16 of brass or other suitable material. The other end of the tube 16 is closed by a metal cap member 17 which is centrally bored to snugly receive one end of a coaxial type thermoelectric generator lead 18 comprising a metallic tubular outer conductor 19 and an insulated coaxial inner conductor 20. The sheath 13 and cap 17 are sealingly and electrically connected to the tube 16 for example by silver soldering or brazing, and the lead 18 is similarly connected to the cap 17.

The thermocouple element means 11 is of frangible material and may take the form of a rod-like or cylindrical ingot of semi-metallic alloy or composition. The thermocouple element means 12 is constructed in a manner to provide resilient mounting means for the thermocouple element 11, engaging the latter throughout its length and resiliently maintaining said element in coaxial spaced relationship within the sheath 13. As shown most clearly in FIGURE 2, the thermocouple element means 12 comprises at least three relatively thin flat strips or bands of deformable, preferably resilient, metal, equiangularly spaced around the thermocouple element 11 and extending the full length and beyond one end of said element to an electrical circuit connection with the outer conductor 19 of the lead 18. The side edges of the metal bands 12 engage the inner surface of the sheath 13 and of the tube 16, and the outer cylindrical surface of the element 11 is engaged by a central longitudinal portion of the inner surface of the metal bands 12.

In order to permit the metal bands 12 to function as a second thermocouple element means while in physical contact with the thermocouple element 11, the inner surfaces of each of said metal bands are provided with an electrically insulating film or layer 21 electrically insulating the inner surfaces of said metal bands from the thermocouple element 11. Silicone resins and varnishes have been found to work out satisfactorily as the insulating films 21 which, because of the low voltages developed, may be very thin. Because of the thin character of the films 21 the bands 12 are formed of metal having a thermal expansion coefficient matching that of the thermocouple element 11, thereby avoiding relative displacement of the bands on said element tending to rub the insulating film 21 off of said element. As an example of such matching, an element 11 of certain lead and selenium-tellurium alloy composition has a coefficient of thermal expansion of approximately $18 \times 10^{-6}$ per degree centigrade which matches the coefficient of thermal expansion of austenitic stainless steel (also aproximately $18 \times 10^{-6}$ per degree centigrade) which is one of the preferred materials for use in the bands 12 and sheath 13. Another satisfactory material for use in the bands 12 and having a similar coefficient of thermal expansion is beryllium copper alloy.

The outer ends of the metal bands 12 are turned radially inwardly and said ends and the outer end of the thermocouple element 11 are mechanically and electrically joined, as through a contact electrode 22 to be hereinafter described, to provide a hot junction for the thermocouple 10. The element 11 is one element of the couple 10, while the bands 12 serve both as a cushion for the element 11 and as the other element of the couple 10. The thermal voltages developed in the elements 11 and 12 are preferably of opposite sign (relative to platinum) with respect to the temperature gradient, and hence are additive in a series circuit formed between a cold junction tip 24 forming a part of a contact electrode 23, and the cold ends of the metal bands 12. In the illustrated embodiment, where the element 11 generates a negative E.M.F., the bands 12 should generate a positive E.M.F. Austenitic stainless steel and beryllium copper alloys are examples of metals which generate a positive E.M.F., and can be used for the bands 12. Where a positive element 11 is used, the bands 12 are preferably made of metal which generates a negative E.M.F., for example Alumel or constantan. The cold junction pin 24 is connected in circuit with the inner conductor 20 of the lead 18 by means of a flexible conductor 25 as shown to permit differential thermal expansion between the elements 11 and 12.

The thermocouple element 11 is a semi-metallic element and may be formed for example of an alloy further described in the copending application of Sebastian Karrer, Serial No. 475,540, filed December 15, 1954, now Patent No. 2,811,570 comprising lead and at least one member of the group tellurium, selenium and sulphur.

Mechanical and electrical contact between the metal bands 12 and the semi-metallic thermocouple element 11 is made over a substantial area of the latter through the contact electrode 22. Similar contact with the opposite end of the element 11 is made over a substantial area thereof through the contact electrode 23. Such contact electrodes provide contacts of low thermal and electric resistance, and are chemically stable with respect to the element 11. As more fully described in the copending application of Russell E. Fredrick, Robert W. Fritts and William V. Huck, Serial No. 475,539, filed December 15, 1954, now Patent No. 2,811,569, iron is especially adapted for use as contact electrode material with lead-tellurium-selenium compositions in that it does not alloy or dissolve in such elements at temperatures below 700° C., which is well above the ordinary upper limit of operating temperatures for elements of lead-tellurium-selenium composition. For a semi-metallic element of any of the compositions aforedescribed, including those comprising lead and sulphur, contact electrodes of carbon having pressure type contact with the element are suitable.

The contact electrodes 22 and 23 may be of either a pressure or bonded type. In the latter case the element-electrode interface should have a mechanical strength at least comparable to that of the alloy of which the element 11 is made.

The coaxial lead 18 affords means for connecting the illustrated thermoelectric generator 10 into an external circuit. The end of the lead 18 remote from the generator 10 carries a connector nut 26, and the outer tubular lead conductor 19 is radially outwardly flared, as as 27, for engagement by the end of said nut. The inner lead conductor 20 has a low resistance electrical connection with a terminal tip member 28, and a relatively rigid annular insulating spacer 29 surrounds said inner lead conductor 20 and is interposed between the tip 28 and the flange 27 to insulate said tip from said flange while at the same time maintaining a predetermined minimum spacing between said flange and tip. The spacer is preferably of glass melamine or other suitable material.

The insulation 30 between the inner and outer lead conductors 20 and 19 terminates short of the flange 27, as at 31. Surrounding the inner lead conductor 20 within the outer lead conductor 19 and between the insulating washer 29 and the end portion 31 of the insulation 30, is an insulating seal 32 of pliable material, for example silicone rubber, which directly contacts both the inner and outer lead conductors. Prior to the connection of the lead 18 to the generator 10 and after the terminal tip 28 is fixed to the end of the inner conductor 20 and the seal 32 and insulating spacer 29 are positioned on said conductor, an axial pull is exerted on the inner conductor to draw the spacer 29 and tip 28 toward the flange 27 and thereby force the pliable seal 32 into the adjacent end of outer conductor 19 and into sealing engagement with both the inner conductor 20 and said outer conductor. While the inner conductor is thus under tension, the outer conductor is crimped, as at 9, to frictionally clamp the inner conductor 20 through the insulation 30. This clamping engagement maintains the portion of the inner conductor between the crimped portions 9 and the tip 28 under continuous tension so that the seal 32 is continuously compressed by the spacer 29 and the aforementioned hermetic seal between the conductors 19 and 20 is continuously maintained.

By virtue of the seal 32 and of the aforedescribed sealing connections between the lead 18 and cap 17, between the extension tube 16 and said cap and between said tube and the sheath 13, an hermetically sealed envelope is provided which encloses the thermoelectric generator elements 11 and 12 and comprises the tubular lead conductor 19, cap 17, tubular member 16 and sheath 13. This envelope or enclosure is preferably filled with an inert atmosphere to prevent oxidation of the element 11.

By having the outer lead conductor 19 form part of the hermetically sealed enclosure, the seal 32 is conveniently located remote from the couple 10 and the heat to which said couple is subjected. The seal 32 need not, therefore, be of a character which can withstand high temperatures. The lead 18 is connected into an external circuit by threading the connector nut 26 into a lead connector socket 33 having a terminal tip 34 insulatably mounted therein for contact by the terminal tip 28 in a manner well known in the art. Tightening of the nut 26 in the socket 33 compressively stresses the sealing material 32 within the tube 19 between the insulation 30 and the washer 29, thus causing said material to intimately contact all of the confining surfaces and provide an hermetic seal between the conductors 19 and 20.

While the coaxial lead 18 with its improved sealing means is shown in detail in connection with a specific thermoelectric generator structure, it is to be understood that the invention contemplates the use of said lead with any electrical device with which it can form an hermetically sealed envelope for the protection of one or more elements enclosed in said envelope.

What is claimed as the invention is:

1. In combination a coaxial type lead having a tubular outer conductor sealingly closed at one end and provided at its other end with a radially outwardly directed annular flange, said lead also having an inner conductor terminating at said other end adjacent said flange, a terminal tip on said other end of said inner conductor in spaced overlapping relation with respect to said flange, a relatively rigid annular insulating spacer surrounding said inner conductor and interposed between said flange and said terminal tip so that opposite sides of said spacer are in face-to-face relation with said flange and with said tip respectively, an annular seal of pliable insulating material surrounding said inner conductor and engaging the side of said insulating spacer facing said flange, and connector means cooperating with said flange and adapted for cooperation with complementary connector means to effect electrical connection of said lead into an electrical circuit and to simultaneously insure abutment of said opposite sides of said spacer with said flange and with said terminal tip respectively, said pliable seal being of such size that by movement of said spacer into abutment with said flange said seal is compressively stressed into the adjacent end of said outer conductor and into direct hermetic sealing engagement with both of said conductors to thereby form with said lead an hermetically sealed envelope.

2. In combination a coaxial type lead having a tubular outer conductor sealingly closed at one end and provided at its other end with a radially outwardly directed annular flange, said lead also having an inner conductor terminating at said other end adjacent said flange, a terminal tip on said other end of said inner conductor in spaced overlapping relation with respect to said flange, a relatively rigid annular insulating spacer surrounding said inner conductor and interposed between said flange and said terminal tip so that opposite sides of said spacer are in face-to-face relation with said flange and with said tip respectively, an annular seal of pliable insulating material surrounding said inner conductor and engaging the side of said insulating spacer facing said flange, said inner conductor being stressed in tension to bias said tip axially toward said flange, said pliable seal being of such size that the bias on said tip, acting through said spacer, compressively stresses said seal into the adjacent end of said outer conductor and into direct hermetic sealing engagement with both of said conductors to thereby form with said lead an hermetically sealed envelope, and means on said outer conductor clampingly engaging said inner conductor to retain the latter under said tensile stress and thereby said seal under said compressive stress.

3. In combination a coaxial type lead having a tubular outer conductor sealingly closed at one end and provided at its other end with a radially outwardly directed annular flange, said lead also having an inner conductor terminating at said other end adjacent said flange, a terminal tip on said other end of said inner conductor in spaced overlapping relation with respect to said flange, a relatively rigid annular insulating spacer surrounding said inner conductor and interposed between said flange and said terminal tip so that opposite sides of said spacer are in face-to-face relation with said flange and with said tip respectively, an annular seal of pliable insulating material surrounding said inner conductor and engaging the side of said insulating spacer facing said flange, said inner conductor being stressed in tension to bias said tip axially toward said flange, said pliable seal being of such size that the bias on said tip, acting through said spacer, compressively stresses said seal into the adjacent end of said outer conductor and into direct hermetic sealing engagement with both of said conductors to thereby form with said lead an hermetically sealed envelope, said outer conductor being crimped to provide inwardly offset portions clampingly engaging said inner conductor to retain the latter under said tensile stress and thereby said seal under said compressive stress.

4. In combination a coaxial type lead having a tubular outer conductor sealingly closed at one end and provided at its other end with a radially outwardly directed annular flange, said lead also having an inner conductor terminating at said other end adjacent said flange, a terminal tip on said other end of said inner conductor in spaced overlapping relation with respect to said flange, an insulating sleeve surrounding said inner conductor within said outer conductor and terminating short of said flange to afford an annular space surrounding said inner conductor within said outer conductor adjacent said flange, a relatively rigid annular insulating spacer surrounding said inner conductor and interposed between said flange and said terminal tip so that opposite sides of said spacer are in face-to-face relation with said flange and with said tip respectively, an annular seal of pliable insulating material surrounding said inner conductor and engaging the side of said insulating spacer facing said flange, and connector means cooperating with said flange and adapted for cooperation with complementary connector means to effect electrical connection of said lead into an electrical circuit and to simultaneously insure abutment of said opposite sides of said spacer with said flange and with said terminal tip respectively, said pliable seal being of such size that by movement of said spacer into abutment with said flange said seal is compressively stressed into said annular space within the adjacent end of said outer conductor and into direct hermetic sealing engagement with both of said conductors to thereby form with said lead an hermetically sealed envelope.

5. In combination a coaxial type lead having a tubular outer conductor sealingly closed at one end and provided at its other end with a radially outwardly directed annular flange, said lead also having an inner conductor terminating at said other end adjacent said flange, a terminal tip on said other end of said inner conductor in spaced overlapping relation with respect to said flange, an insulating sleeve surrounding said inner conductor within said outer conductor and terminating short of said flange to afford an annular space surrounding said inner conductor within said outer conductor adjacent said flange, a relatively rigid annular insulating spacer surrounding said inner conductor and interposed between said flange and said terminal tip so that opposite sides of said spacer are in face-to-face relation with said flange and with said tip respectively, an annular seal of pliable insulating material surrounding said inner conductor and engaging the side of said insulating spacer facing said flange, said inner conductor being stressed in tension to bias said tip axially toward said flange, said pliable seal being of such size that the bias on said tip, acting through said spacer, compressively stresses said seal into said annular space within the adjacent end of said outer conductor and into direct hermetic sealing engagement with both of said conductors to thereby form with said lead an hermetically sealed envelope, and means on said outer conductor clampingly engaging said inner conductor to retain the latter under said tensile stress and thereby said seal under said compressive stress.

References Cited in the file of this patent

UNITED STATES PATENTS

| | | |
|---|---|---|
| 1,555,885 | Smith | Oct. 6, 1925 |
| 1,863,390 | Beckert | June 14, 1932 |
| 2,207,771 | Arden | July 16, 1940 |
| 2,278,448 | Ingalls | Apr. 7, 1942 |
| 2,296,766 | Bruno | Sept. 22, 1942 |
| 2,318,775 | Guelson | May 11, 1943 |
| 2,318,822 | Wantz | May 11, 1943 |
| 2,321,119 | Alferg | June 8, 1943 |
| 2,328,111 | Thornberg | Aug. 31, 1943 |
| 2,506,644 | Johnson | May 9, 1950 |
| 2,615,949 | Hecking | Oct. 28, 1952 |
| 2,632,863 | Norton | Mar. 24, 1953 |
| 2,691,056 | Wolff | Oct. 5, 1954 |
| 2,761,110 | Edlen | Aug. 28, 1956 |
| 2,767,355 | Wolff | Oct. 16, 1956 |
| 2,831,047 | Wadey | Apr. 15, 1958 |

FOREIGN PATENTS

| | | |
|---|---|---|
| 515,683 | Great Britain | Dec. 12, 1939 |